United States Patent [19]

Lacoste

[11] Patent Number: 4,504,863
[45] Date of Patent: Mar. 12, 1985

[54] DEVICE FOR CORRECTING A VIDEOFREQUENCY TELEVISION SIGNAL BY DYNAMIC ATTENUATION OF THE NOISE LEVEL

[75] Inventor: Jean P. Lacoste, Paris, France

[73] Assignee: Thomson-CSF, Paris, France

[21] Appl. No.: 381,883

[22] Filed: May 25, 1982

[30] Foreign Application Priority Data

May 27, 1981 [FR] France ................. 81 10562

[51] Int. Cl.³ ............................................. H04N 5/21
[52] U.S. Cl. ...................................... 358/167; 358/166
[58] Field of Search ................ 358/167, 166, 36, 37; 455/305, 306, 249, 303; 328/167

[56] References Cited

U.S. PATENT DOCUMENTS 4,009,334 2/1977 Sypula ................................. 358/167
4,031,547 6/1977 Saiki .................................... 358/167

FOREIGN PATENT DOCUMENTS 2219590 9/1974 France.

Primary Examiner—Michael A. Masinick
Attorney, Agent, or Firm—Cushman, Darby & Cushman

[57] ABSTRACT

A correcting device for dynamically reducing the noise pollution level with respect to a videofrequency signal mainly comprises an analog multiplier in which two previously generated signal components are multiplied by each other. One signal designated as the filtered signal is the result of a passage of the initial signal through a low-pass filter. The other signal or so-called contour signal is the difference between the initial signal and the filtered signal. The contour signal noise is cancelled at the time of the zero-crossings of the filtered signal and variably attenuated according to the level of the filtered signal in the case of the other levels of the signal. Addition of the filtered signal and of the contour signal processed and suitably adjusted for amplitude reconstitutes a corrected videofrequency signal.

4 Claims, 4 Drawing Figures

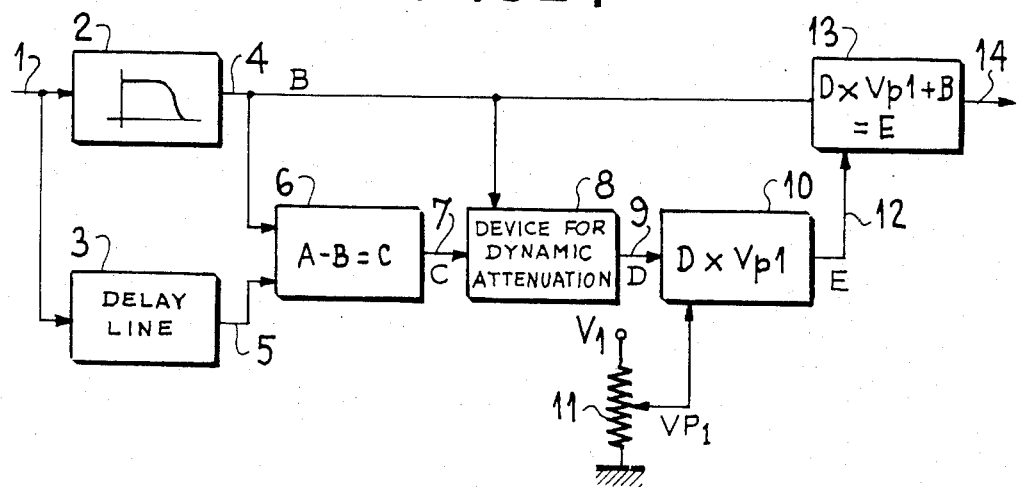
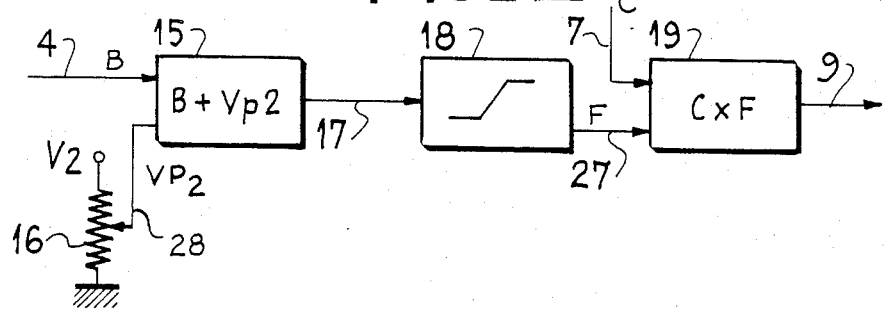
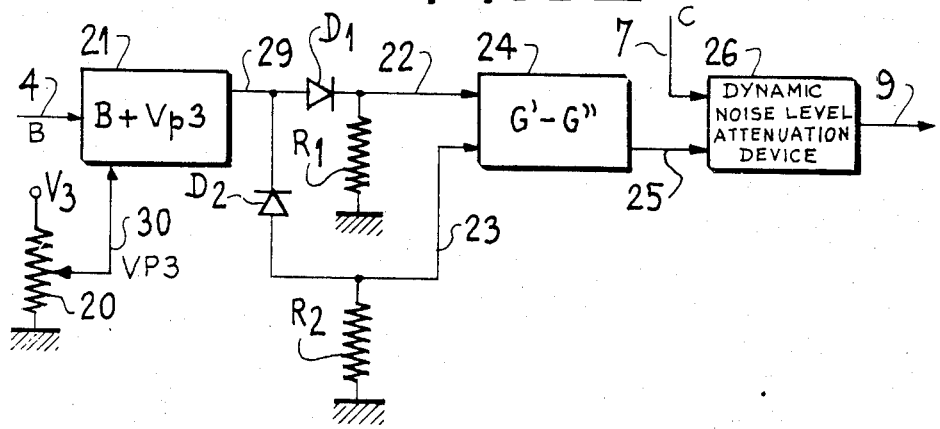

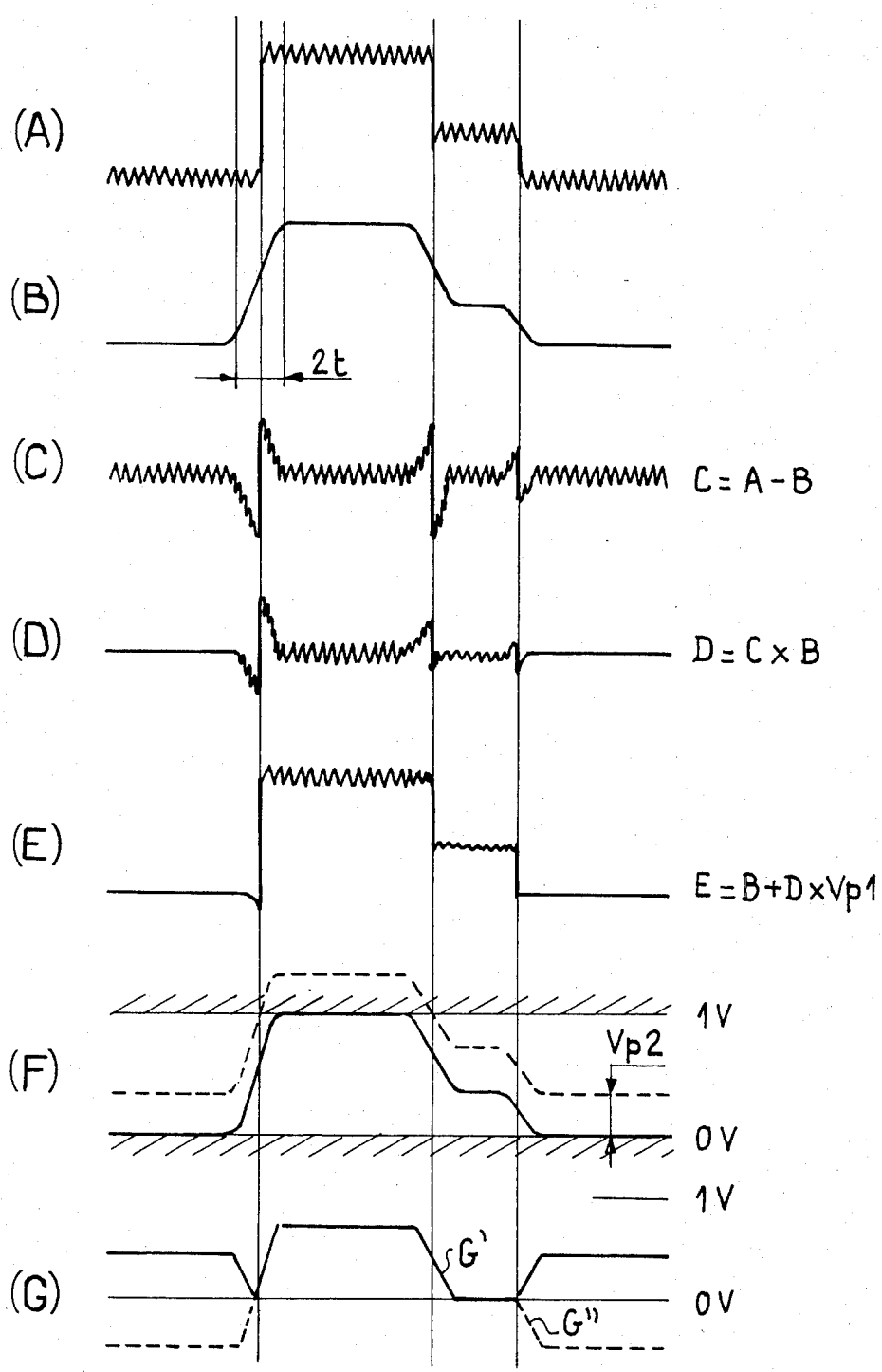

DEVICE FOR CORRECTING A VIDEOFREQUENCY TELEVISION SIGNAL BY DYNAMIC ATTENUATION OF THE NOISE LEVEL

This invention relates to a videofrequency-signal correcting device of the type used in television cameras. These devices compensate for nonlinearity of the amplitude-frequency characteristic of pickup tubes without increasing, in the video signal, the noise level which originates from the preamplifiers.

A device of this type is usually provided for the purpose of adjusting contours with a low-pass filter in which a filtered signal obtained from the initial signal is freed from high-frequency components and noise components. A difference circuit produces a contour signal by subtraction of the filtered signal from the initial signal. When the filtered signal and the suitably adjusted contour signal are added in an adding circuit, a reconstituted signal is thus produced and corresponds to the corrected initial signal. Prior to generation of the reconstituted signal, the contour signal is processed with a view to reducing noise by means of a threshold peak limiter. To this end, the noise components, which have a zero mean value in the uniform ranges are not transmitted if the peak values do not exceed the threshold value. On the other hand, the contour signal whose instantaneous values are higher than the threshold value is transmitted and produces action after it has been freed from part of the noise components in the reconstituted signal.

Said device makes it possible to solve the problem but only in the case of continuous and relatively minor noise pollution. In fact, the noise peaks which exceed the peak-limiting threshold and appear when the gain increases cannot be corrected by a circuit of this type. Furthermore, the threshold must be of fairly low value in order to ensure that contour signals of small amplitude are retained. In addition, high-luminance ranges are corrected for noise in much the same manner as dark ranges, which is undesirable in the case of signals to be subjected to nonlinear or so-called "gamma" corrections which serve to compensate for the voltage-light response of cathode-ray tubes.

The object of the invention is to overcome the disadvantages outlined in the foregoing.

To this end, the invention is directed to a device for correcting a videofrequency television signal by dynamic attenuation of the noise level. The device accordingly comprises a filter for eliminating the high-frequency components and the noise components of the initial signal in order to form a filtered signal, a difference circuit for producing a contour signal by subtracting the filtered signal from the initial signal, a circuit for adding the filtered signal and a contour signal which is processed so as to form a corrected reconstituted signal. According to one distinctive feature, the contour signal is applied to the signal input of a dynamic noise-attenuation device having a filtered-signal input connected to the filter output; this circuit delivers at its output a signal which has been noise-processed by attenuation which is variable with the level of the filtered video-frequency signal between a maximum attenuation adjustable with respect of a predetermined level at which the noise can be suppressed and a minimum attenuation.

According to another distinctive feature, the invention is also concerned with a device for correcting a videofrequency television signal, comprising an analog signal multiplier for producing dynamic attenuation of the noise level in the contour signal by modulating this latter as a function of the level of the videofrequency signal.

The advantage of this device results in considerable noise attenuation on a preferential luminance level which can be the level corresponding to the dark zones of the image, the noise attenuation coefficient being independent of the noise level but variable as a function of the videofrequency level and adjustable by the user.

The invention is also directed to an image source comprising a correcting device of this type.

These and other features of the invention will be more apparent to those skilled in the art upon consideration of the following description and accompanying drawings, wherein:

FIG. 1 shows the correcting device according to the invention;

FIG. 2 shows a first embodiment of the dynamic noise-level attenuation device of FIG. 1;

FIG. 3 shows a second embodiment of the noise-level attenuation device;

FIG. 4 shows the diagrams of video signals resulting from each step of the process.

In FIG. 1, the initial signal, as shown for example in diagram A of FIG. 4, comprises a black-to-white transition, a white-to-grey transition, a grey-to-black transition, and has a uniform noise component. Said signal is applied to the input 1 which is connected to the input of a filter 2 for delivering at its output 4 the filtered signal B of diagram B of FIG. 4. The signal B is freed from the noise component but a rise and fall time having a value $2t$ is assigned to said signal. A difference circuit 6 is connected on the one hand to the output 4 of the filter and on the other hand to the output 5 of a delay line 3 having a time-delay $t$, the input of which is connected to the input 1. Said delay line transmits the input signal in phase with the filtered signal. The difference circuit 6 delivers at its output 7 the contour signal $C=A-B$ as represented by diagram C of FIG. 4. Said output 7 is connected to a first input of a device 8 for dynamic attenuation of the noise level which will be described with reference to FIGS. 2 and 3. The second input of said device is connected to the output 4 of the filter 2.

The device 8 for dynamic attenuation of the noise level produces action on the contour signal C and delivers at its output 9 a contour signal D represented by diagram D of FIG. 4, in which the noise is suppressed within the ranges corresponding to a predetermined level of the filtered videofrequency signal, namely the black level. The noise is attenuated by a coefficient which is variable with the level of the filtered videofrequency signal in the case of the other levels of said signal. The output 9 of the device 8 is connected to one input of a variable-gain amplifier 10, the gain of which is dependent on a reference voltage $V_{p1}$ which is applied to its second input and is available on the sliding contact of the potentiometer 11, the ends of which are connected between a positive direct-current voltage $V_1$ and ground. The output 12 of the amplifier 10 delivers a contour signal E which is represented by diagram E of FIG. 4, has an adjustable amplitude, and is corrected for noise. The output 12 of the amplifier 10 is connected to one input of an adding circuit 13 which is also connected via another input to the output 4 of the filter 2 for delivering the filtered signal B. The adding circuit 13 delivers a reconstituted signal E which is contour-corrected and variably attenuated in noise level as a function of the videofrequency signal level A (diagram E in FIG. 4).

One embodiment of the dynamic noise-level attenuation device 8 is shown in FIG. 2. The input 7 of said device at which the contour signal C is available is connected to the first input of a multiplier circuit 19. The circuit multiplies the contour signal C by a multiplier signal F applied to the second input 27. The signal F is produced from the signal B delivered by the filter 2, applied to a first input of an adding circuit 15 and available at the output 27 of a peak-limiting circuit 18, the thresholds of which limit the signal at the output 27 to minimum and maximum values corresponding to *zero* and *one* multiplication factors in the case of the multiplier circuit 19. An attenuation of the level of the contour signal C and therefore of the noise at the output 9 of the multiplier corresponds to any instantaneous value of the signal F and is at a maximum in the case of the voltage corresponding to the lower threshold of the limiting circuit (let 0V be this value), and at a minimum in the case of the voltage corresponding to the upper threshold of the limiting circuit (let 1V be this value). The signal applied to the input 17 of the peak-limiting circuit 18 is derived from the adding circuit 15 which forms the sum of the filtered signal (which is assumed to be between the amplitudes 0 and 1V) applied to its first input and a direct-current voltage $V_{p2}$ applied to its second input 28. Said voltage $V_{p2}$ is available on the sliding contact of the potentiometer 16, the ends of which are supplied between a positive voltage $V_2 = +1V$ and ground. In the case of $V_{p2}=0$, the zero-level dark ranges on the filtered signal B correspond to attenuated noise-level ranges and the high-luminosity ranges at level 1V which are not attenuated retain the initial noise level (diagram D of FIG. 4). In the case of an initial signal which does not carry noise, the voltage $V_{p2}$ will be chosen equal to 1V and the contours will be completely retained. The position of the filtered signal F at the output of the peak-limiting circuit is represented in diagram F in a full line in respect of $V_{p2}=0$, in dashed lines in respect of an intermediate value of $V_{p2}$ between 0 and 1V. In the case of an intermediate value of this order, the noise is not attenuated throughout the peak-limited range at 1V and the attenuation is of high value but not of maximum value in respect of the levels corresponding to the black ranges. On the other hand, the contours may be more effectively retained.

In the embodiment described in the foregoing, maximum attenuation of the noise level is obtained in respect of $V_{p2}=0$ in the dark ranges of the videofrequency signal. It may prove useful in some applications to suppress the noise entirely in the videofrequency signal with respect to another preferential level such as the medium luminance ranges, for example.

FIG. 3 shows a second embodiment of the dynamic noise-level attenuation device 8 provided for this purpose. The device comprises all the elements of FIG. 2 assembled together at 26 with the input 7 for the contour signal and the output 9 for the same signal after noise attenuation. The second input of the device 26 which is identical with that of FIG. 2 is no longer connected directly to the filter output 4 but to the output 25 of a circuit 24 for additional processing of the filtered signal. The processing circuit 24 comprises an adding circuit 21 which superimposes on the filtered signal B a direct-current voltage $V_{p3}$ which is applied to its input 30. This voltage is available on the sliding contact of the potentiometer 20, the ends of which are supplied between the voltage $V_3 = -1V$ and ground. At the output 29 of the adding circuit 21, the filtered signal has a zero value in respect of a grey level of the videofrequency signal which is dependent on the voltage $V_{p3}$. The components having a luminosity which is higher than said grey level are positive (component G' in diagram G of FIG. 4) and are transmitted via the diode $D_1$ to the input 22 of a difference circuit 24 which is loaded via the resistor $R_1$. The components having a luminosity which is darker than said grey level will be negative (component G" in diagram G of FIG. 4) and transmitted via the diode $D_2$ to the input 23 of the difference circuit 24 which is loaded via the resistor $R_2$. The output 25 will deliver to the circuit 26 (the device of FIG. 2) a signal of positive polarity (as represented by a full line in diagram G of FIG. 4) in which only the components of a grey level (which may range from black to white) chosen by adjusting the potentiometer 20 will have a zero value. This enables the user to induce a reduction in noise level over any grey level as a function of operating requirements. It is always possible to regulate the noise by means of the potentiometer 16 of FIG. 2.

A device of this type employed either alone or additionally in conjunction with a known device such as a threshold peak limiter on image sources such as a camera, a diapositive reader, a telecinema system and the like have a flexibility of use which improve operating conditions and the possibilities of equipment in cases of weak illumination of televised scenes by considerably reducing the noise level in dark zones, for example, while retaining small details.

What is claimed is:

1. A device for correcting a video-frequency television signal by dynamic attenuation of the noise level, comprising:

a filter for eliminating the high-frequency components and noise components of the video frequency signal, having an input for receiving the video frequency signal and an output for generating a filtered signal, a difference circuit having a first input connected at the output of the filter and a second input receiving the video frequency signal for producing a contour signal by subtracting the filtered signal from the video frequency signal, a dynamic noise attenuation device having an output for delivering a noise processed signal and having a first input connected to the output of the difference circuit and a second input connected to the output of the filter for controlling the attenuation level of the dynamic noise attenuation device with the level of the filtered signal supplied by the filter between a maximum attenuation with respect to a predetermined level of the video frequency signal at which the noise can be suppressed and a minimum attenuation, and a circuit coupled to the output of the filter and to the output of the dynamic noise attenuation device for adding the filtered signal to the noise processed signal to form the corrected video frequency television signal.

2. A device according to claim 1 for correcting a videofrequency television signal, wherein the dynamic noise attenuation device comprises an analog multiplier having a first input connected to the output of said difference circuit and a second input coupled to the output of said filter via a processing circuit comprising a first level displacement circuit and a peak limiting circuit having upper and lower limits corresponding to the multiplication factors 0 and 1, said processing unit being intended to permit adjustment of maximum attenuation over the predetermined level of the videofrequency signal.

3. A device according to claim 2 for correcting a videofrequency television signal further comprising an additional processing unit for coupling said level displacement circuit to the output of said filter, said additional processing unit comprising a second level displacement circuit connected to the output of said filter delivering at its output a 0 volt level when the filter signal supplied by said filter has the value corresponding to said predetermined level of the video frequency signal, the output of said second displacement circuit being coupled to the input of said first displacement circuit through a rectifying circuit.

4. A device according to claim 1 for correcting a videofrequency signal, wherein said device further comprises means for additional processing of the contour signal by threshold peak-limiting and adjustment of amplitude.

* * * * *